(12) United States Patent
Chumley

(10) Patent No.: US 6,964,427 B2
(45) Date of Patent: Nov. 15, 2005

(54) TRAILER ACCESSIBLE FROM EACH END AND METHOD

(76) Inventor: William M. Chumley, 3303 Green Pond Rd., Woodruff, SC (US) 29388

( * ) Notice: Subject to any disclaimer, the term of this patent is extended or adjusted under 35 U.S.C. 154(b) by 206 days.

(21) Appl. No.: 09/887,741

(22) Filed: Jun. 22, 2001

(65) Prior Publication Data

US 2002/0195794 A1 Dec. 26, 2002

(51) Int. Cl.[7] ............................................. B60D 1/54
(52) U.S. Cl. ................... 280/491.3; 414/483; 296/57.1
(58) Field of Search ............................. 280/462–466, 280/474, 479.2, 491.1, 491.3; 296/50, 57.1; 414/491, 481, 482, 483, 484, 480

(56) References Cited

U.S. PATENT DOCUMENTS

| | | | | |
|---|---|---|---|---|
| 2,351,829 A | * | 6/1944 | Milner | 280/434 |
| 3,245,714 A | * | 4/1966 | Blair | 296/182 |
| 3,342,508 A | * | 9/1967 | Thomas | 280/414.1 |
| 3,580,404 A | * | 5/1971 | Moser | 414/537 |
| 4,019,643 A | * | 4/1977 | Kampman et al. | 280/463 |
| 4,050,598 A | * | 9/1977 | Schurz | 280/463 |
| 4,248,561 A | * | 2/1981 | Graves | 198/518 |
| 6,109,641 A | * | 8/2000 | Guy | 280/423.1 |

FOREIGN PATENT DOCUMENTS

GB 2164625 A * 3/1986 ............. B60P/1/00

* cited by examiner

*Primary Examiner*—Kevin Hurley
(74) *Attorney, Agent, or Firm*—Dority & Manning, P.A.

(57) ABSTRACT

Apparatus and method for facilitating access to articles from a rear end and a front end of a trailer (A) disclose the use of a hydraulic cylinder (D) exerting a force between a towbar (C) and the trailer for pivoting the trailer on its wheels (B) to make the trailer accessible without obstruction by the towbar and towing vehicle. Cylinders (F) are provided for facilitating raising and lowering ramps at the front and rear ends of the trailer.

6 Claims, 6 Drawing Sheets

TRAILER ACCESSIBLE FROM EACH END AND METHOD

BACKGROUND OF THE INVENTION

This invention relates to trailers carried behind a towing vehicle and more particularly to apparatus and method for facilitating loading and unloading the trailer from both ends.

Trailers such as those commonly used by landscapers, are pulled by an elongated connected member such as a towbar. The trailers are connected to the towbar so as to be maintained in alignment behind a towing vehicle when transported from location to location. Due to the positioning of articles to facilitate transport heavier articles such as lawnmowers are placed toward the front of the trailer during towing, other equipment must be stacked behind the heavier equipment to be utilized in landscaping. The trailers generally have a platform constructed of boards running longitudinally of the trailer and include a rear gate which may be constructed of expanded metal or other suitable material. The back gates are generally manually lowered and the unloading operation then proceeds requiring that the entire trailer be unloaded in order to gain access to an article such as a lawnmower positioned toward the front of the trailer.

Efforts have been made to facilitate the unloading of trailers. For example U.S. Pat. No. 5,544,944, illustrates a utility trailer having a bed which is mounted upon a towbar for tilting toward the rear for unloading. The problem of facilitating loading and unloading of the trailers has persisted.

SUMMARY OF THE INVENTION

Accordingly, it is an important object of the invention to provide entry through each end of the trailer, thus facilitating access to articles at any location in the trailer.

Another important object of the invention is to provide a method whereby a trailer is connected through an elongated member to a towing vehicle that includes apparatus for pivoting the trailer about an intermediate portion and in the case of the usual landscape trailers, the ability to pivot about the centrally located wheels.

Another important object of the invention is the provision of operating apparatus for raising and lowering gates or ramps at each end of the trailer by the use of a suitable device such as a linear actuator.

The invention contemplates the use of a linear actuator with an elongated connector or towbar between the trailer and a towing vehicle. The towbar is pivoted at one end and on the trailer and on the other end to the towing vehicle. A force is exerted by the linear actuator to pivot the bed of the trailer about an intermediate portion thereby freeing the front end of the trailer from obstruction by the connector and towing vehicle.

While the invention has been described in terms relating to a landscaping trailer, it is to be understood that the apparatus and method according to the invention have application to any form of trailer connected to a towing vehicle for facilitating access to the front end of the trailer.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3-A is a perspective view at an enlarged scale illustrating the rear pivot connection between the towbar and the trailer;

DESCRIPTION OF A PREFERRED EMBODIMENT

A trailer for carrying a load behind a towing vehicle has an elongated load carrying bed A carried by wheels B. An elongated member or towbar connection C is provided for connecting the elongated load carrying bed to the towing vehicle so that an adjacent front end of the bed is accessible substantially free of obstruction by the towing vehicle and connecting member. A linear actuator D is provided for pivotally moving the bed with respect to the connecting member A. A stop member E is preferably provided to aid in limiting movement between the bed and the connecting member when it is in alignment with the bed during towing. End members open and close the respective adjacent ends of the trailer bed as by a linear actuator F.

Figure 1:
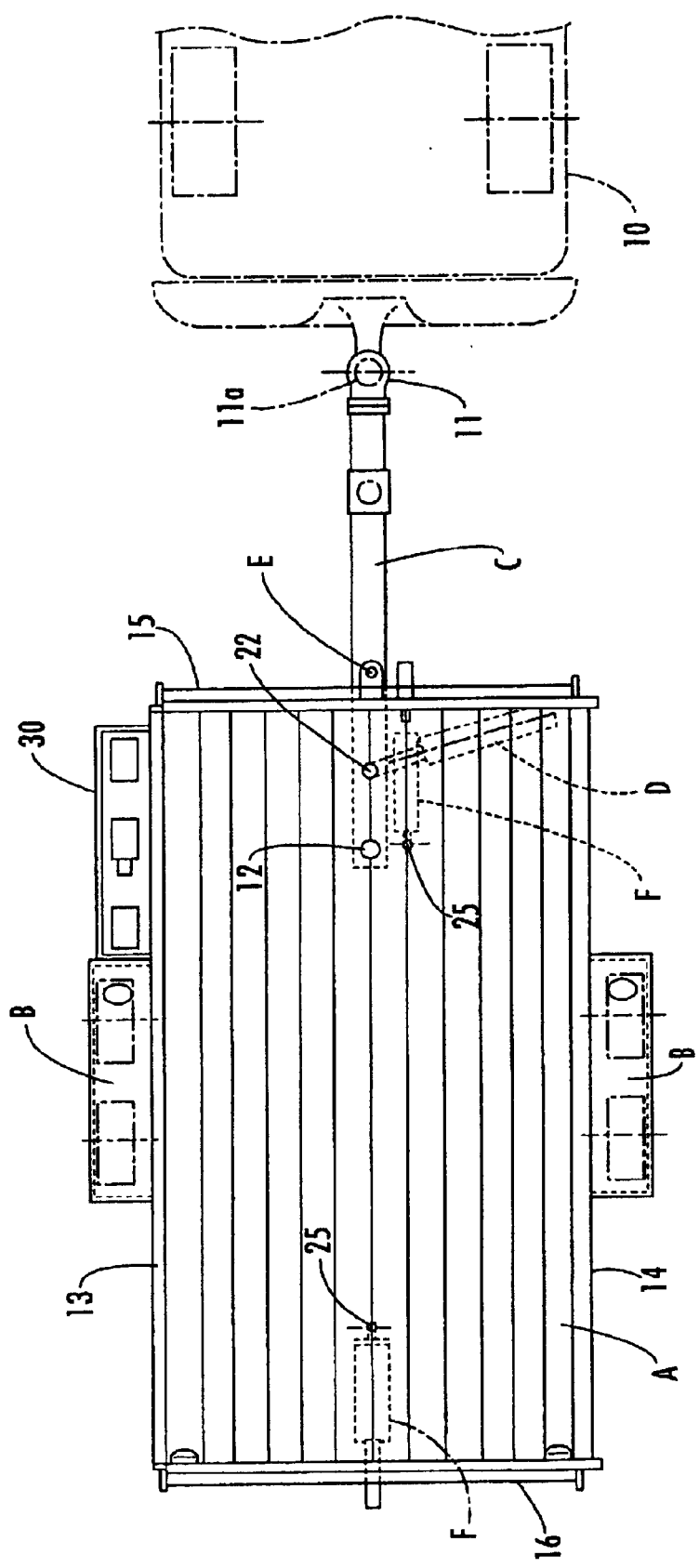
FIG. 1 is a top plan view illustrating a utility trailer such as may be used by landscapers being connected in line by a towbar behind a towing vehicle such as a pickup truck illustrated in broken lines.
Figure 2:
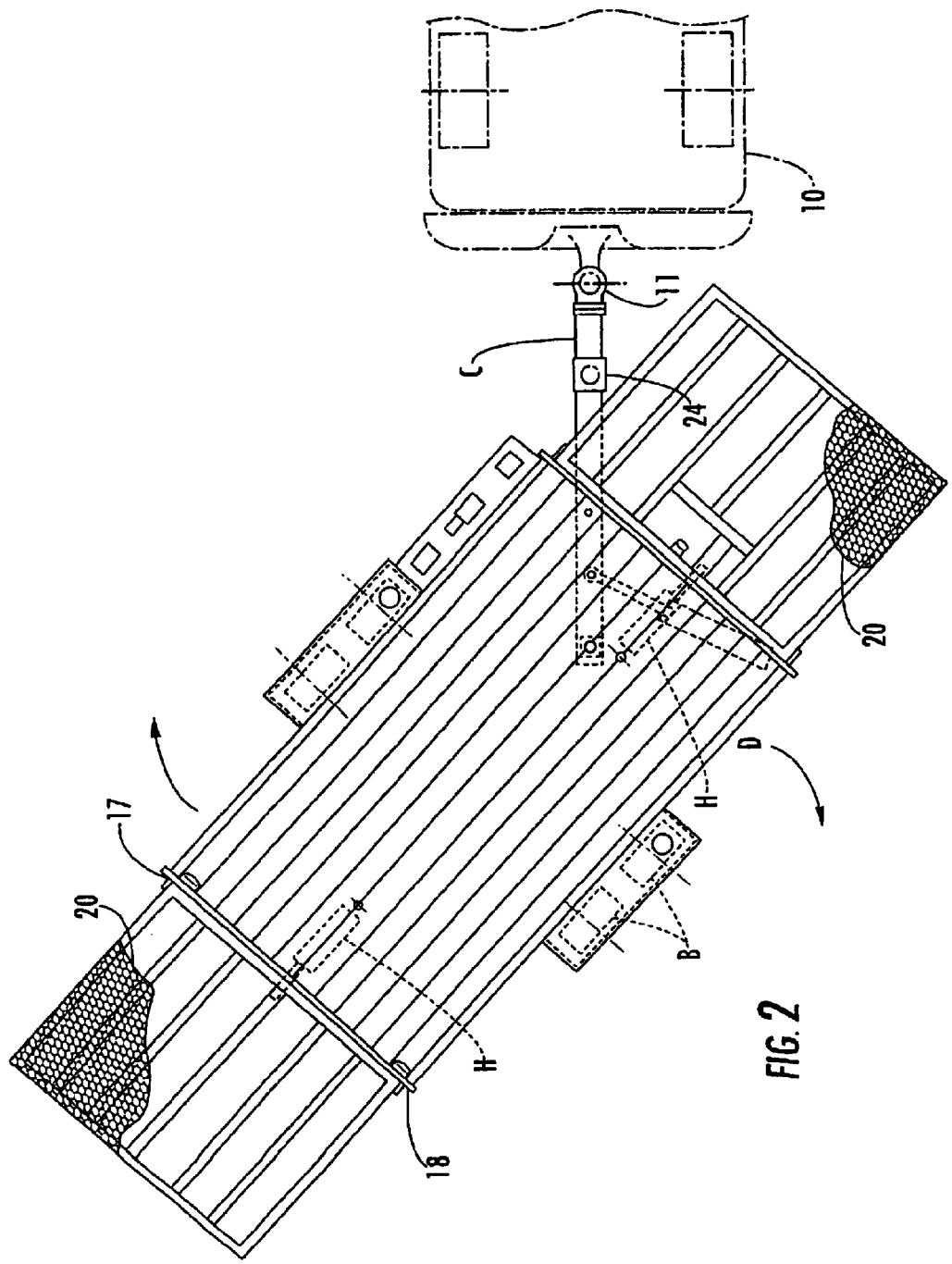
FIG. 2 is a top plan view of the apparatus illustrated in FIG. 1, with the trailer having been pivoted about the wheels in the direction of the arrows with front and rear gates down in a position to serve as ramps for loading and unloading the trailer from each end without obstruction.
Figure 4:
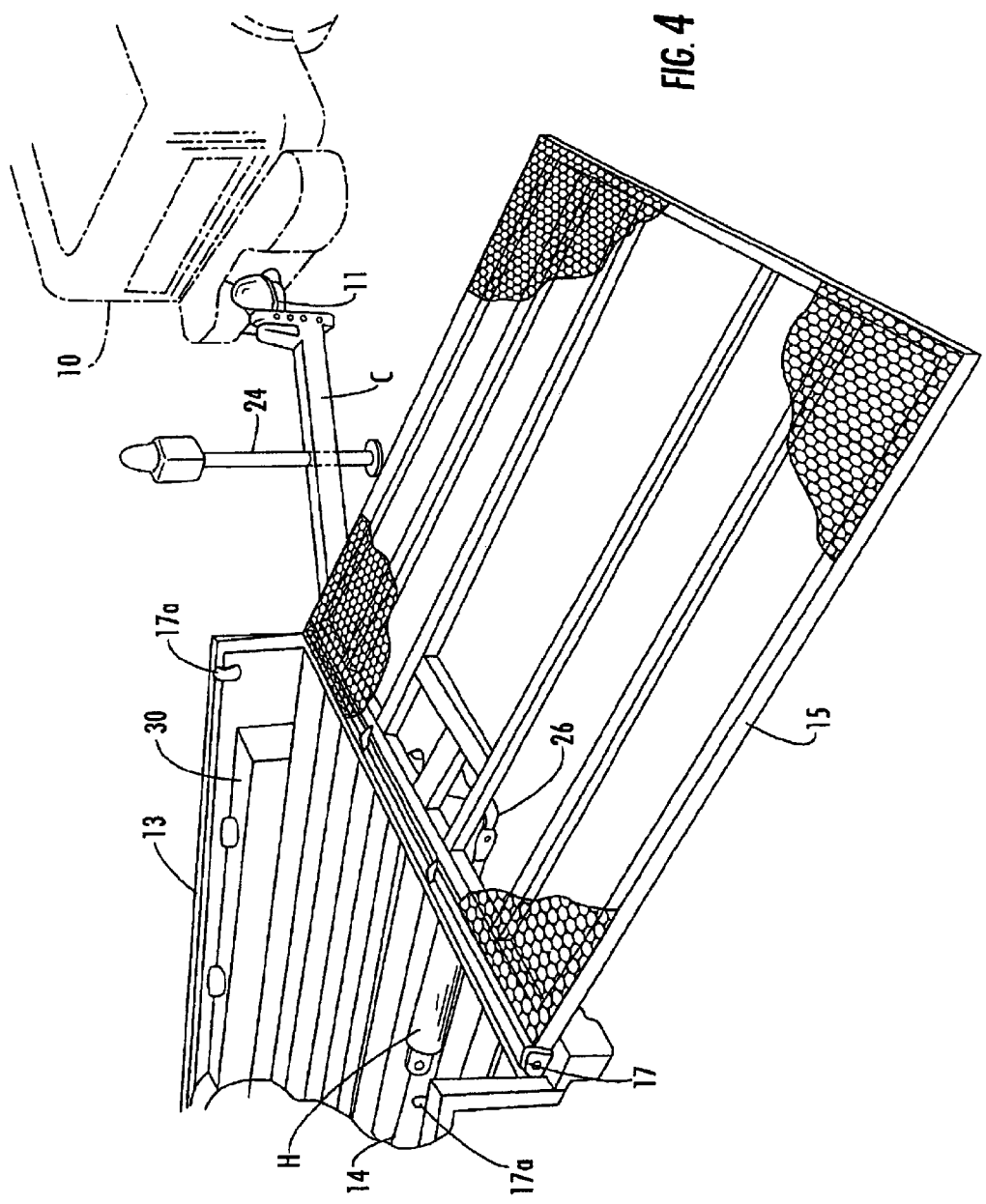
FIG. 4 is a perspective view illustrating the gate at the front of the trailer in lower position to serve as a ramp.

Referring more particularly to the drawings FIGS. 1, 2, and 4, illustrate a towing vehicle in broken lines as at 10. A towbar C is pivotally connected as at 11 to a suitable trailer hitch 11a. The towbars are pivotally connected as at 12 are to a forward immediate portion of the trailers between the sides of the trailer 13 and 14.

The trailer is illustrated as including a front gate or ramp 15 and a rear gate 16. These ramps may be lowered by pivoting them about points connecting the lower part of the gates to the bed A as illustrated at 17 and 18 and are provided with latches 17a and 18a maintaining them in raised position against inadvertent lowering. It will be observed that the gates are constructed to include an expanding metal portion 20 carried upon suitable support framework. The wheels B are positioned immediate the ends of the trailer and are supported by a suitable chassis not shown.

Figure 3:
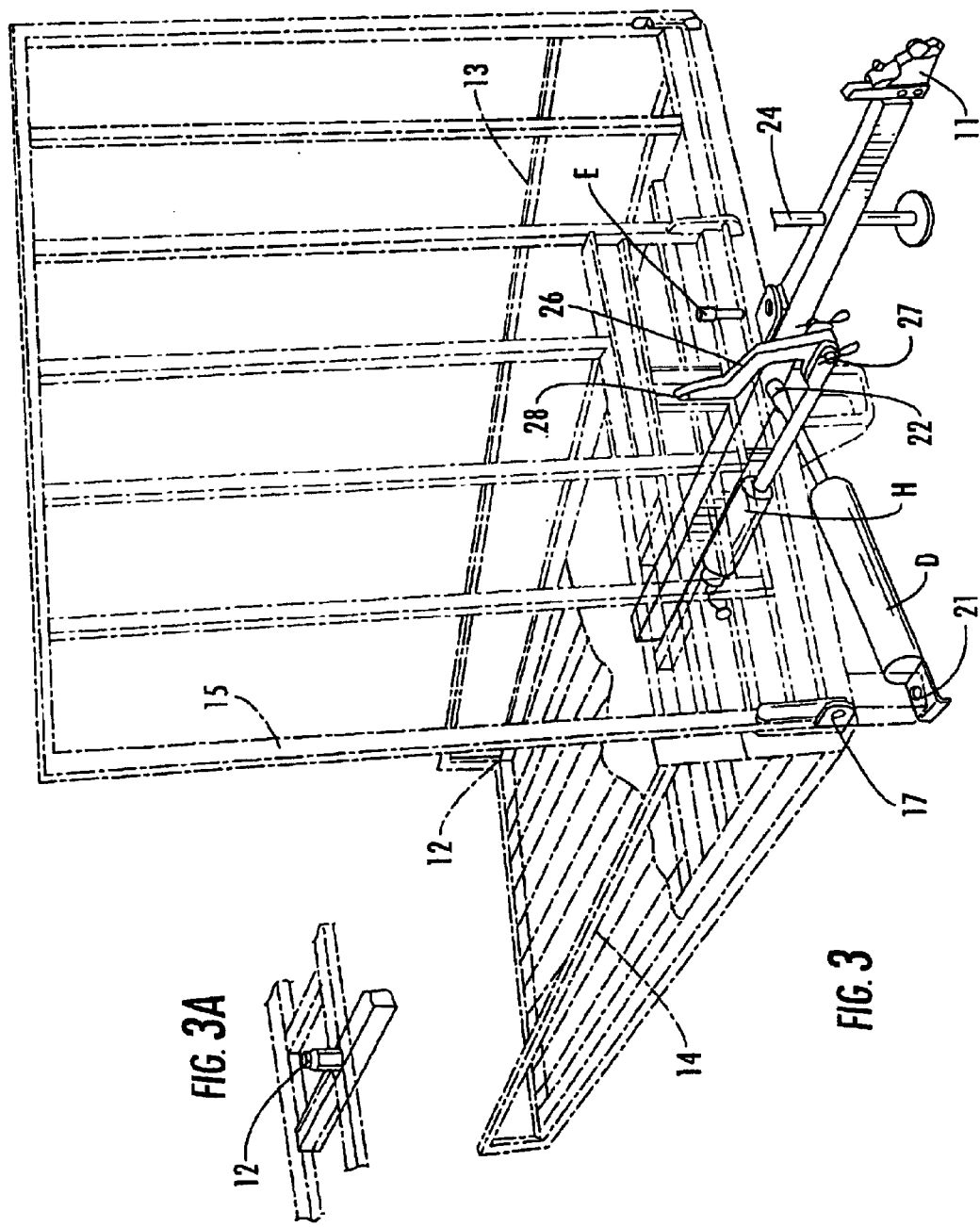
FIG. 3 is a perspective view illustrating a linear actuator for pivoting the trailer about the wheels as illustrated in FIG. 2 together with apparatus for raising and lowering the gate at the front of the trailer.

Apparatus for pivoting the trailer about the wheels as shown by the arrows in FIG. 2 include the linear actuator D illustrated as a hydraulic cylinder is connected at one end at 21 to the framework of the trailer and at the other end as at 22 to the piston rod extending from the cylinder that is connected to an intermediate portion of the towbar C. It will be observed that during towing a pin illustrated at E as best shown in FIG. 3, is positioned to maintain the trailer in alignment with the towing vehicle. By exerting a force through the hydraulic cylinder D between the pivotal connection of the hydraulic cylinder with the bed on one and the towbar on the other end, a force is exerted tending to turn the trailer in a clockwise direction about the pivot point at 12.

Figure 5:
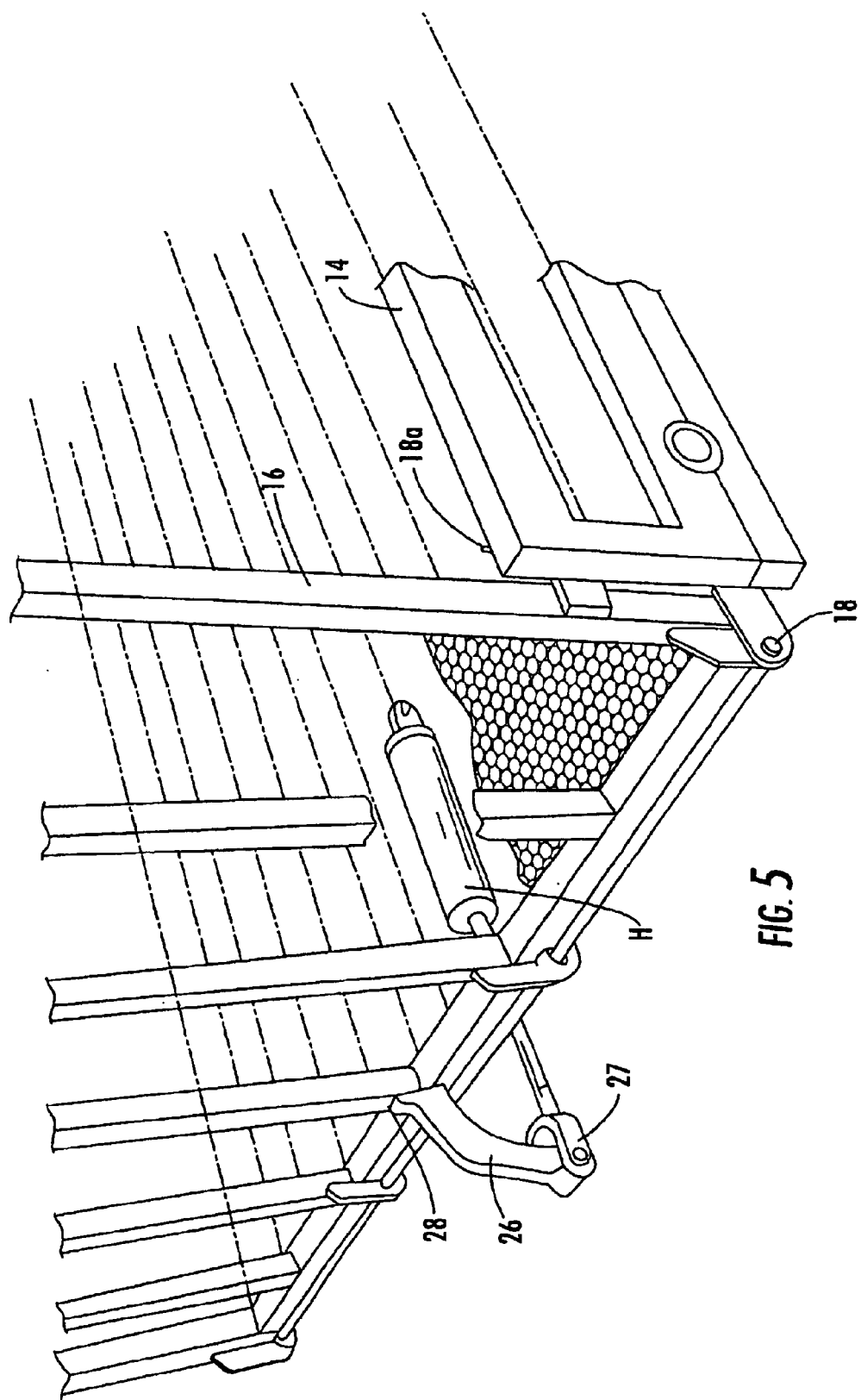
FIG. 5 is a perspective view illustrating apparatus for lowering the rear gate of the trailer.
Figure 6:
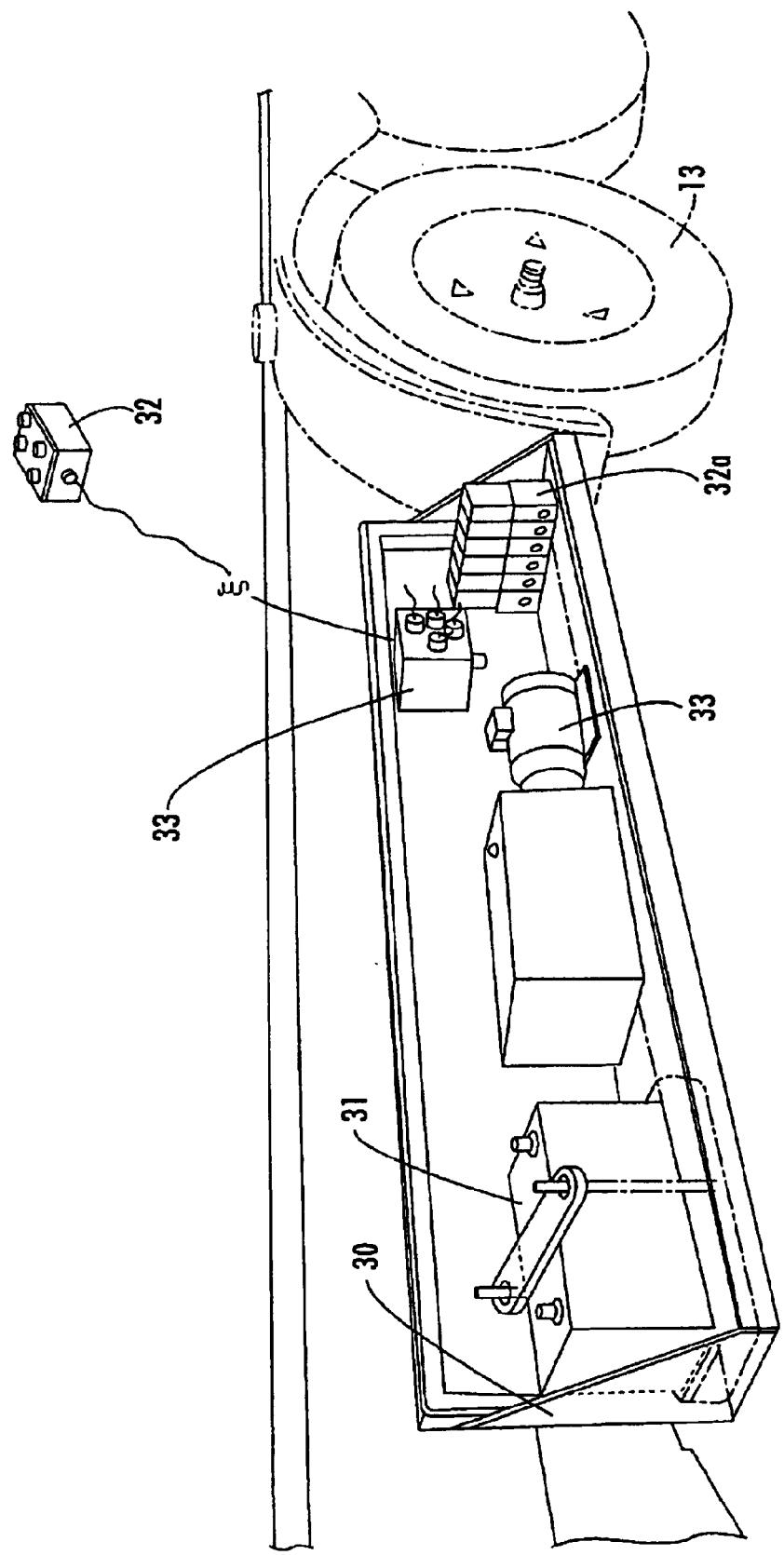
FIG. 6 is a perspective view illustrating the electrical and mechanical components in a block diagram for operating the hydraulic mechanism by an operator standing beside the trailer.

Referring especially to FIG. 4 a hitch jack support 24 is provided to maintain the position of the towbar which whether it is connected between the towing vehicle and the trailer or simply connected on one end to the towing vehicle. Hydraulic cylinders H are positioned in longitudinal alignment at each end of the bed being connected on one end as at 25 with the bed of the trailer and on the other end through suitable linkage 26 (see FIGS. 3 and 5) to a respective gate. The linkage is connected pivotally on one end as at 27 to the head of a respective cylinder and on the other end a fixed connection as at 28 is provided between outside portions of the respective gates and the linkage 26.

The gates may be raised and lowered by power operated apparatus such as the hydraulic cylinders that are positioned just beneath the trailer so as to be out of the way. Operating mechanism for pivoting the trailer and for raising and lowering the front and rear gates includes a system housed in a covered compartment 30 located on a front side of the trailer at the hitch end. Power distribution is supplied from a battery power supply designated at 31 and operator control switches may be positioned along the trailer for energizing the hydraulic pump 33. Push button switches 32, may be suitably connected for operating the respective cylinders for controlling the front ramp, the rear ramp, the pivotal movement of the trailers and the hitch jack. Hydraulic interlocks, not shown, serve to prevent pivoting of the trailer if either ramp is in lowered position. The power distribution apparatus also has suitable contacts for operating the solenoids 32a.

While a preferred embodiment of the invention has been described using specific terms relating to landscaping trailers, such description is for illustrative purposes only, and it is o be understood that changes and variations may be utilized without departing from the spirit or scope of the following claims.

What is claimed is:

1. A trailer transported behind a towing vehicle comprising:

an elongated load carrying bed having front and rear ends;

an elongated member connecting the trailer to the towing vehicle so that an adjacent front end of the bed is spaced from the towing vehicle to permit pivotal movement of the bed intermediate the ends sufficient for the front end to attain accessibility substantially free of obstruction while the elongated member remains substantially stationary and the towing vehicle remains connected to the bed at an angular position thereto sufficient to obtain said accessibility;

a linear actuator pivotally moving the bed to said angular position with respect to the elongated substantially stationary member imparting horizontal pivotal movement to the bed thereby attaining accessibility of the end free of obstruction after forward movement during transport is terminated;

a stop member limiting pivotal movement between the bed and the elongated member during towing thereby maintaining alignment of the bed and the towing vehicle during transport; and an end member opening and closing a said adjacent end of the bed.

2. The trailer set forth in claim 1 including a pivotal mounting having a vertical pivot pin disposed inboard at a front end of the bed connected to an adjacent end of the elongated member.

3. The trailer set forth in claim 1 wherein said stop member includes a pin disconnectably fixing the elongated member in longitudinal alignment with the trailer and the towing vehicle.

4. The trailer set forth in claim 1 wherein opposed wheels are positioned intermediate the ends of the trailer and the trailer is pivoted about the wheels.

5. A method of loading and unloading an elongated trailer having wheels intermediate its ends, an elongated load carrying bed having an end member at each end, and an elongated connecting member hitching the trailer to a towing vehicle and comprising the steps of:

pivotally fastening the connecting member adjacent one end inboard of a front end of the trailer;

hitching the other end of the connecting member to the vehicle;

exerting a force between the Connecting member and the front end of the trailer after towing and forward movement of the trailer and towing vehicle is terminated pivotally moving the trailer in a horizontal plane to an angular position out of alignment in respect to the towing vehicle; and positioning the end member at the front end of the trailer at said angular position out of alignment in respect to the towing vehicle permitting access to the trailer;

whereby such access to the trailer is gained at each end without obstruction by the connecting member and vehicle.

6. The method of loading and unloading an elongated trailer as set forth in claim 5 including the step of pivoting the trailer about opposed wheels upon which the trailer is carried.

\* \* \* \* \*